(12) United States Patent
Sugaya

(10) Patent No.: US 9,609,508 B2
(45) Date of Patent: Mar. 28, 2017

(54) FORCED OPERATING OF SOFTWARE ON A REMOTE TERMINAL

(71) Applicant: OPTiM CORPORATION, Saga (JP)

(72) Inventor: Shunji Sugaya, Tokyo (JP)

(73) Assignee: OPTiM Corporation, Saga (JP)

( * ) Notice: Subject to any disclaimer, the term of this patent is extended or adjusted under 35 U.S.C. 154(b) by 534 days.

(21) Appl. No.: 14/159,939

(22) Filed: Jan. 21, 2014

(65) Prior Publication Data

US 2014/0136665 A1 May 15, 2014

Related U.S. Application Data

(63) Continuation of application No. 13/151,534, filed on Jun. 2, 2011.

(30) Foreign Application Priority Data

Mar. 17, 2011 (JP) .................................. 2011-059509

(51) Int. Cl.
| | | |
|---|---|---|
| *H04W 8/22* | (2009.01) | |
| *G06F 9/445* | (2006.01) | |
| *H04W 4/00* | (2009.01) | |
| *H04L 29/08* | (2006.01) | |
| *H04L 29/06* | (2006.01) | |
| *H04W 8/24* | (2009.01) | |

(52) U.S. Cl.
CPC ............... *H04W 8/22* (2013.01); *G06F 8/61* (2013.01); *H04L 67/125* (2013.01); *H04L 67/34* (2013.01); *H04L 67/40* (2013.01); *H04W 4/001* (2013.01); *H04W 8/245* (2013.01)

(58) Field of Classification Search
CPC ..................................................... H04W 4/001
See application file for complete search history.

(56) References Cited

U.S. PATENT DOCUMENTS

| | | | |
|---|---|---|---|
| 8,107,944 B2* | 1/2012 | Cohan .................. | H04L 63/0263 455/411 |
| 8,244,678 B1* | 8/2012 | Hartland .............. | H04L 67/1095 707/610 |
| 2006/0059530 A1* | 3/2006 | Spielman .............. | H04L 41/082 725/132 |

(Continued)

FOREIGN PATENT DOCUMENTS

| | | | |
|---|---|---|---|
| JP | 2010200114 A | 2/2009 | |
| JP | 2010268497 A | 11/2010 | |

(Continued)

*Primary Examiner* — Oscar Louie
*Assistant Examiner* — Benjamin A Jenkins
(74) *Attorney, Agent, or Firm* — BainwoodHuang

(57) ABSTRACT

A remote system allows a user terminal to execute a program other than those preliminarily stored in the user terminal through remote operation of the user terminal even if a user who receives remote operation cannot operate the user terminal. In the remote system 1 composed of the user terminal 10 to be remotely operated and a remote server 100, the user terminal 10 receives a remote message through a public line network 3 and accesses a destination remote server 100 written in the remote message, regardless of operation input from a user. The user terminal 10 executes a program read out from the accessed remote server, regardless of operation input from a user.

15 Claims, 5 Drawing Sheets

(56) References Cited

U.S. PATENT DOCUMENTS

| | | | | |
|---|---|---|---|---|
| 2006/0073820 A1* | 4/2006 | Craswell | ............... | G06F 8/65 |
| | | | | 455/419 |
| 2007/0093243 A1* | 4/2007 | Kapadekar | ............ | H04W 4/001 |
| | | | | 455/419 |
| 2009/0251282 A1* | 10/2009 | Fitzgerald | ............... | G06F 21/88 |
| | | | | 340/5.31 |
| 2010/0093308 A1* | 4/2010 | Cohan | ................. | H04L 63/0263 |
| | | | | 455/405 |
| 2011/0276961 A1* | 11/2011 | Johansson | ............ | H04W 4/001 |
| | | | | 717/178 |

FOREIGN PATENT DOCUMENTS

| | | | |
|---|---|---|---|
| JP | 2011018333 A | | 1/2011 |
| KR | 20050078741 A | | 8/2005 |
| KR | 20070114243 A | | 11/2007 |
| WO | WO2006045335 A1 | * | 5/2006 |
| WO | 2007131540 A1 | | 11/2007 |
| WO | 2008129773 A1 | | 10/2008 |

* cited by examiner

Fig. 4

<TERMINAL ID CORRESPONDENCE TABLE>

| NO. | TERMINAL ID | CARRIER | SCENARIO |
|---|---|---|---|
| 1 | AAA | COMPANY N | PROGRAM SCENARIO A |
| 2 | PPP-01 | COMPANY S | PROGRAM SCENARIO B |
| 3 | PPP-02 | COMPANY S | PROGRAM SCENARIO C |
| 4 | VV-01 | COMPANY E | PROGRAM SCENARIO D |

Fig. 5

<SCENARIO CONFIGURATION>

| EXECUTION ORDER | PROGRAM SCENARIO A |
|---|---|
| 1 | PROGRAM O1 |
| 2 | PROGRAM O2 |

Fig. 6

<SCENARIO SELECTION TABLE>

| TERMINAL ID | CARRIER | INSTRUCTION ID | SCENARIO |
|---|---|---|---|
| AAA | COMPANY N | 1 | PROGRAM SCENARIO A1 |
|  |  | 2 | PROGRAM SCENARIO A2 |

Fig. 7

<INSTRUCTION COMMAND CORRESPONDENCE TABLE>

3 : OPEN CONFIGURATION SETTINGS

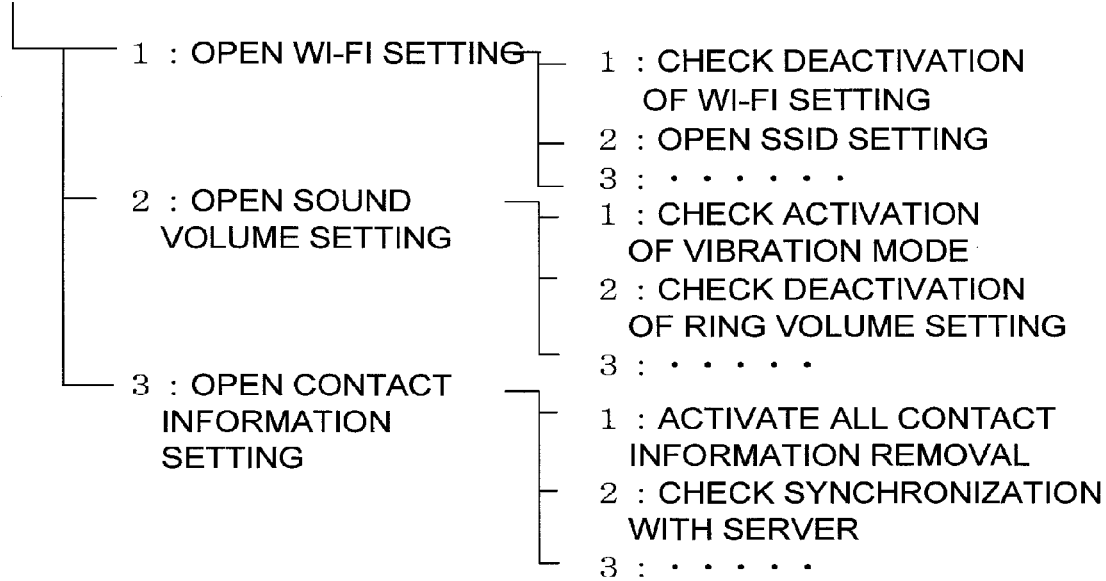

FORCED OPERATING OF SOFTWARE ON A REMOTE TERMINAL

This application is a continuation of U.S. patent application Ser. No. 13/151,534, filed on Jun. 2, 2011 which is based on and claims the benefit of priority from Japanese Patent Application No. 2011-059509, filed on 17 Mar. 2011, the contents of which are incorporated herein by reference.

TECHNICAL FIELD

The present invention relates to a remote operation system and a remote operation method that remotely operate a user's terminal connected through a public line network.

BACKGROUND ART

In recent years, various services have been provided for users by connecting portable terminals connected with a web server and the like through a public line network. In particular, advanced services, which have been provided for personal computers conventionally, has become possible to provide for mobile phones by the appearance of smart phones (highly functional mobile phones).

Then, in order to maximize the use of such advanced web services and the high functionality of smart phones, users need to know the operation of configuration and the function of a smart phone. In addition, if users who are not used to the operation configure their own terminals for the first time, configuration information that should not be deleted may actually deleted, or inappropriate configuration may be set to cause an error.

For approaching such problems, there has been a known method of remotely operating a user's terminal from a system to remotely configure the user's terminal and remotely guide the user of the terminal. For example, the patent documents 1 and 2 disclose that a server acquires the screen information of each client to be supported and displays this screen information to achieve remote operation.

CITATION LIST PATENT LITERATURE

Patent document 1: Japanese Unexamined Patent Application 2011-018333
Patent document 2: Japanese Unexamined Patent Application 2010-268497

On the other hand, it is not limited to an objective for guiding how to configure and use a user terminal. There is a demand for remotely operating a user terminal. For example, a smart phone typically stores private information such as contact information, a bank account number, and a pin code. Then, there is a problem that others can view such private information when a smart phone is lost. In this case, it is preferred that private information stored in a smart phone be remotely deleted. However, the patent documents 1 and 2 do not disclose any solution for problems that happened, for example, when a smart phone is lost because users should be able to operate their own user terminals, i.e. smart phones.

To solve such problems, for example, it is considered that in predetermined remote operation of a smart phone, a predetermined program is preliminarily stored in a smart phone, and this predetermined program is started by conducting some remote trigger operation to execute a function achieved by this predetermined program. However, in this case, the function of only a predetermined program preliminarily stored can be executed, thereby causing limited remote operation and less convenience.

SUMMARY OF INVENTION

An object of the present invention is to provide a remote system and a remote operation method that enable a user terminal to execute a program other than those preliminarily stored in the user terminal through remote operation of the user terminal even if a user who receives remote operation cannot operate the user terminal.

According to a first aspect of the present invention, the user terminal includes:
an access module receiving a remote message through a public line network and accessing a destination remote server written in the remote message, regardless of operation input from a user; and
a program execution module executing a program read out from the accessed remote server, regardless of operation input from a user.

According to the first aspect of the present invention, the user terminal receives a remote message through a public line network and accesses a destination remote server written in the remote message, regardless of operation input from a user. Then, the user terminal executes a program read out from the accessed remote server, regardless of operation input from a user.

Therefore, the user terminal can execute a program other than those preliminarily stored in the user terminal (i.e. a program read out from a remote server) through remote operation of the user terminal even if a user who receives remote operation cannot operate the user terminal.

In categories of the invention, not only a system but also a method has functions and effects similar to those according to the first aspect of the present invention.

According to a second aspect of the present invention, the remote system includes an user terminal and a remote server, in which
the user terminal includes:
an access module receiving a remote message through a public line network, accessing a destination remote server written in the remote message, and sending a terminal ID that identifies the user terminal, regardless of operation input from a user; and
a program execution module receiving and executing a program that has been enabled to be sent from the accessed remote server, regardless of operation input from a user, and
the remote server includes:
a program selection module receiving the terminal ID sent from the user terminal, identifying at least one of the communication common carrier and the terminal model of the user terminal based on the terminal ID, selecting a program based on the identification result, and enabling the program to be sent to the user terminal.

Therefore, the user terminal can execute a program other than those preliminarily stored in the user terminal (i.e. a program read out from a remote server) through remote operation of the user terminal even if a user who receives remote operation cannot operate the user terminal.

In categories of the invention, not only a system but also a method has functions and effects similar to those according to the second aspect of the present invention.

According to a third aspect of the present invention, the remote system includes an user terminal, a remote server, and an instruction server, in which the instruction server includes:

a command generation module accepting input of a command to be executed on the user terminal from an instructor and generating a remote message including the command; and a remote message sending module sending the remote message to the user terminal, and the user terminal includes:

an access module receiving the remote message through a public line network, accessing a destination remote server written in the remote message, and sending the command to the remote server, regardless of operation input from a user; and a program execution module executing a predetermined program based on the command, regardless of operation input from a user.

Therefore, the user terminal can execute a program other than those preliminarily stored in the user terminal (i.e. a program read out from a remote server) through remote operation of the user terminal even if a user who receives remote operation cannot operate the user terminal.

In categories of the invention, not only a system but also a method has functions and effects similar to those according to the third aspect of the present invention.

The present invention can provide a remote system and a remote operation method that enable a user terminal to execute a program other than those preliminarily stored in the user terminal through remote operation of the user terminal even if a user who receives remote operation cannot operate the user terminal.

BRIEF DESCRIPTION OF DRAWINGS

FIG. 4 illustrates a terminal ID correspondence table;

FIG. 5 illustrates a program scenario configuration;

FIG. 6 illustrates a scenario selection table;

FIG. 7 illustrates an instruction command correspondence table;

DESCRIPTION OF EMBODIMENTS

Hereinafter, a best mode of the present invention will be described with reference to attached drawings. However, this is illustrative only, and the scope of the present invention is not limited thereto.

Remote System Configuration

Figure 1:
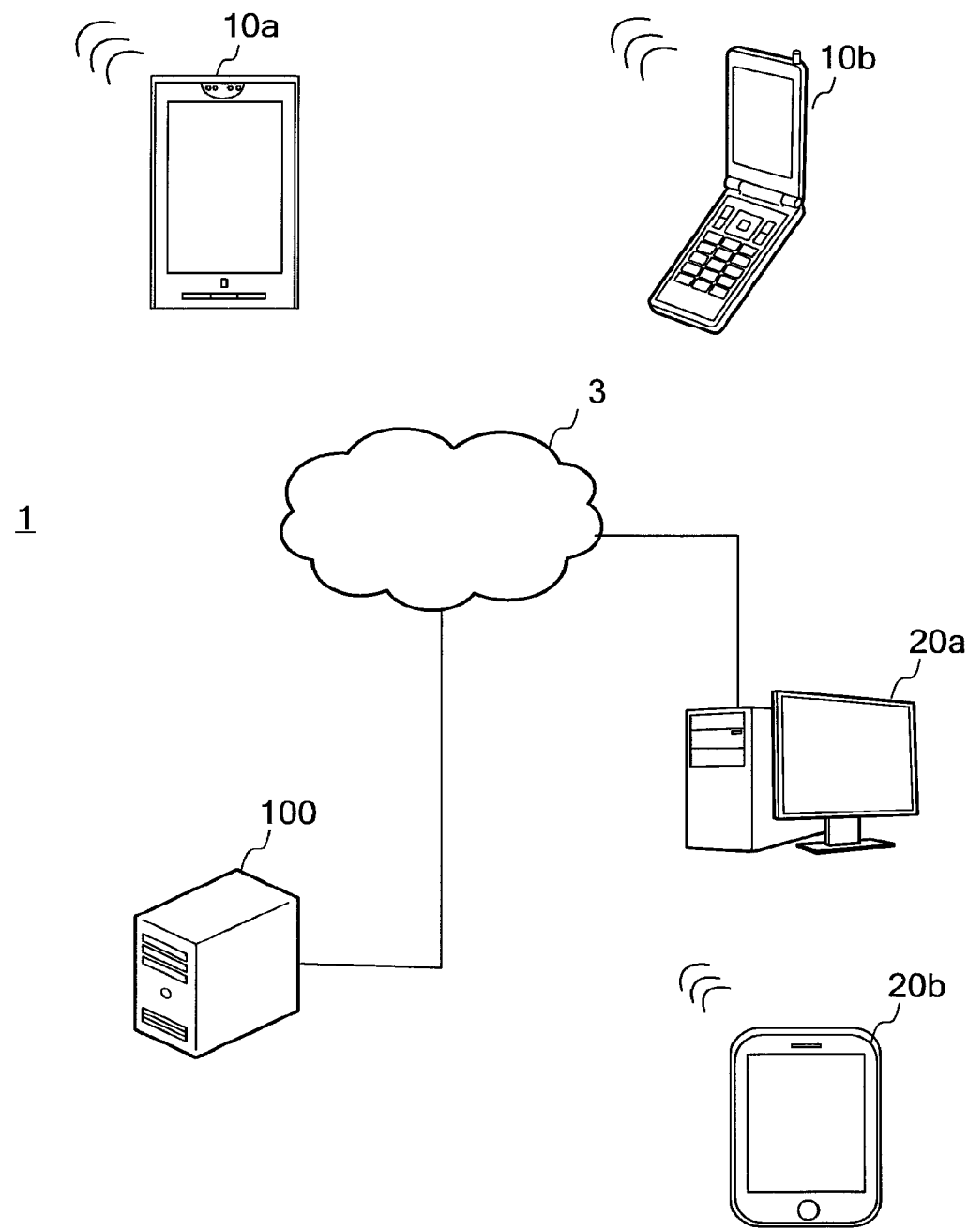
FIG. 1 is a schematic diagram of a remote system 1.

FIG. 1 is a system configuration diagram of the remote system 1 that is a preferred embodiment of the present invention. The remote system 1 includes user terminals 10a and 10b (hereinafter simply put "a user terminal 10), a remote server 100, a public line network 3 (the Internet, the third and the fourth generation communication network, and the like), and instruction servers 20a and 20b (hereinafter simply put "an instruction server 20").

The user terminal 10 is communicatably connected with the remote server 100 through the public line network 3. The remote server 100 and the instruction server 20 may be connected through a local area network (hereinafter referred to as "LAN") or through the public line network 3. The communication in the remote system 1 may not be wireless communication nor wire communication. The user terminal 10 may be communicatably connected with the public line network 3 through a network device such as a router.

The user terminal 10 may be a general information terminal, which is an information device or an electrical appliance with functions described hereinafter. For example, a user terminal 10 may be an information appliance such as a smart phone 10a, a mobile phone 10b, a compact multimedia terminal, a net book terminal, a slate terminal, an electronic book terminal, or an electronic dictionary terminal.

It is preferred that the user terminal 10 be a terminal capable of sending and receiving remote messages such as an email message, a short message, a multimedia message, and the like. In particular, initialization has to enable the user terminal to receive remote messages regardless of user operation.

The instruction server 20 is a general information terminal used by a remote operator to remotely operate a user terminal 10.

Functions

Figure 2:
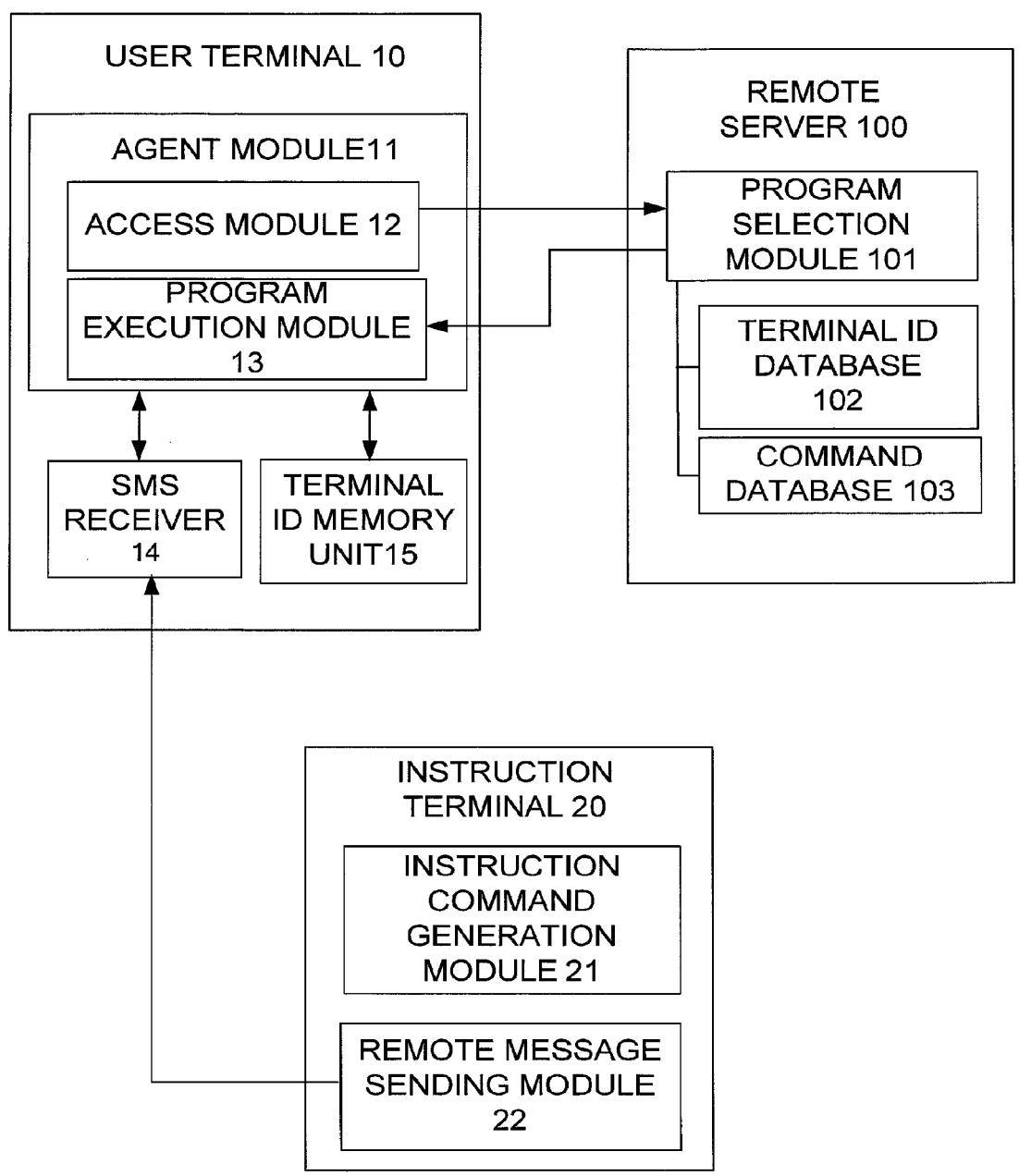
FIG. 2 is a functional block diagram of a user terminal 10, a remote server 100, and an instruction server 20.

FIG. 2 illustrates the relationship among the respective functions of an instruction terminal 20, a remote server 100, and a user terminal 10.

The user terminal 10 and the instruction terminal 20 include a control unit including a central processing unit (hereinafter referred to as "CPU"), a random access memory (hereinafter referred to as "RAM"), and a read only memory (hereinafter referred to as "ROM"), and the like; and a communication unit including Wireless Fidelity® or WiFi® enabled device complying with, for example, IEEE802.11, a wireless device complying with the IMT-2000 standard such as the third generation mobile communication system, or the like. The communication unit may include a wired device for LAN connection.

The user terminal 10 and the instruction terminal 20 also include a display unit outputting and displaying data and images controlled by the control unit as an output unit; and a touch panel, a keyboard, a mouse, and the like that receive input from a user and a remote operator as an input unit. The user terminal 10 and the instruction server 20 also include a data storage unit as a memory unit such as a hard disk or a semiconductor memory.

In the user terminal 10, the control unit reads a predetermined program and cooperates with the communication unit, the output unit, the input unit, and the memory unit to achieve an agent module 11, an SMS receiver 14, and a terminal ID memory unit 15. The agent module 11 includes an access module 12 and a program execution module 13. The specific function of each module will be described with reference to FIG. 3.

In the instruction terminal 20, the control unit reads a predetermined program and cooperates with the communication unit, the output unit, the input unit, and the memory unit to achieve an instruction command generation module 21 and a remote message sending module 22. The specific function of each module will be described with reference to FIG. 3.

The remote server 100 includes a control unit composed of a CPU, a RAM, a ROM, and the like; and a communication unit, for example, a LAN enabled device complying with IEEE802.11. The remote server 100 also includes a data storage unit as a memory unit such as a hard disk or a semiconductor memory.

The control unit of the remote server 100 reads a predetermined program and cooperates with the communication unit and the memory unit to achieve a program selection module 101, a terminal ID database 102, and a command database 103. The function of each of these modules will be described with reference to FIG. 3.

Remote Operation Process

Figure 3:
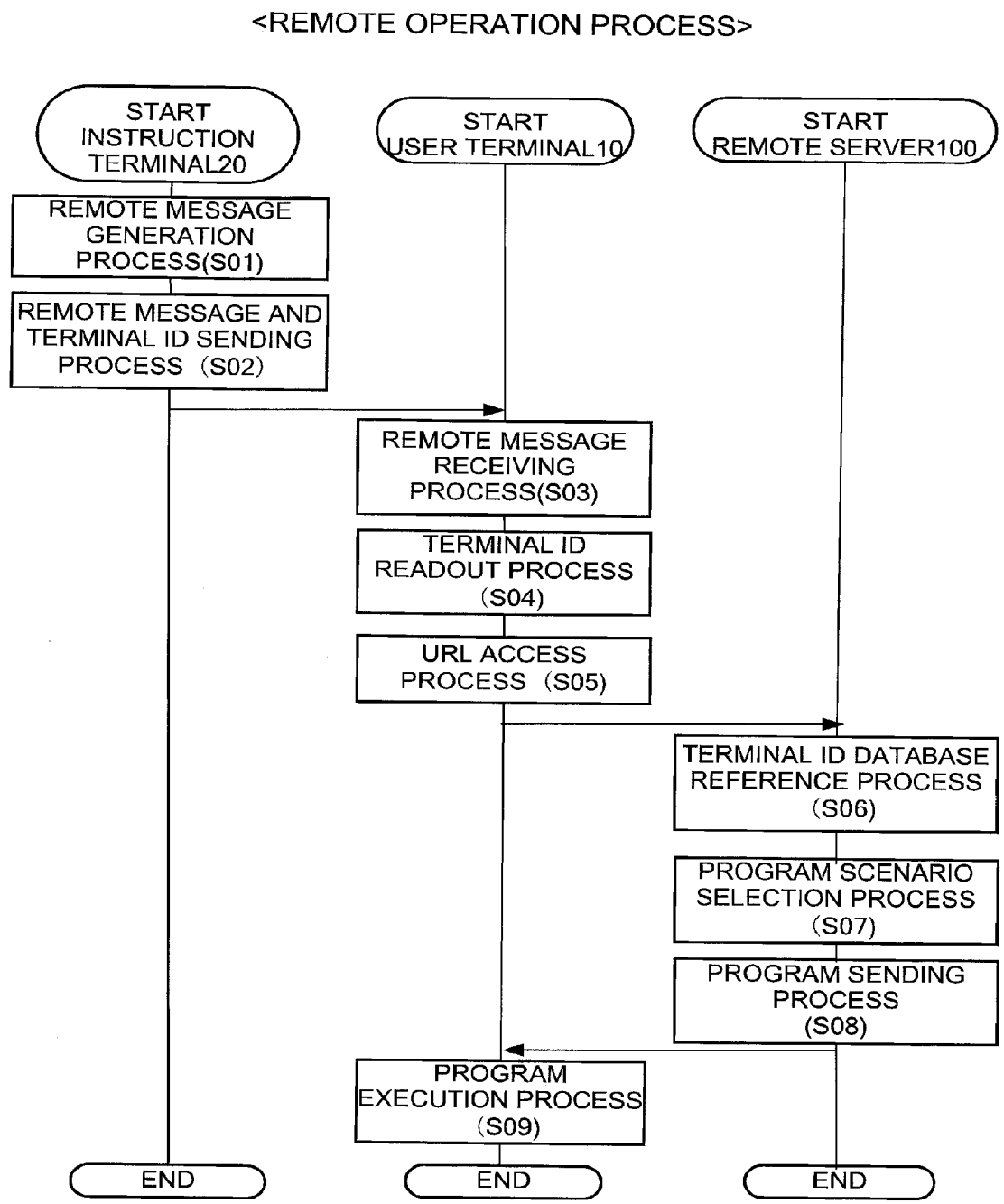
FIG. 3 is a flow chart diagram illustrating a remote operation process that the user terminal 10, the remote server 100, and the instruction server 20 execute.

FIG. 3 is a flow chart illustrating a remote operation process that the instruction server 20, the user terminal 10, and the remote server 100 execute.

First, the remote message sending module 22 of the instruction server 20 generates a remote message based on operation from a remote operator (Step S01). The remote message is generated by operable editing software on the instruction server 20.

The remote message includes address information (a URL or an IP address) for accessing the remote server 100 or address reference information regardless of input of a remote operator. The remote message also includes an instruction ID and an instruction command indicating the operation of a remote operator as described hereinafter.

Then, the remote message sending module 22 of the instruction server 20 sends the generated remote message and a terminal ID to the user terminal 10 based on operation from a remote operator (Step S02). The remote message may be sent from the instruction server 20 to the user terminal 10 through a predetermined mail server.

The terminal ID is a unique identifier for specifying the user terminal 10, which may be a phone number, a hardware serial number, a mail address, an international mobile subscriber identity (hereinafter referred to as "IMSI") of a subscriber identity module (hereinafter referred to as "SIM"), or cookie information of the user terminal 10. Alternatively, the terminal ID may be a terminal model or a manufacture name for specifying the hardware specification of the user terminal 10.

The SMS receiver 14 of the user terminal 10 receives the remote message (Step S03). Then, the access module 12 of the agent module 11 reads out a terminal ID included in the remote message (Step S04). The access module 12 also reads out the address information or the address reference information of the remote server 100 to identify the remote server 100 to be accessed based on the read address information and then performs a URL access process (or an IP address access process) (Step S05.) In this access process, the access module 12 sends the terminal ID to the remote server 100.

The address reference information may be a predetermined ID. When the agent module 11 of the user terminal 10 receives this ID, with reference to a table preliminarily associating the ID with address information, the address information is read out to identify the remote server 100.

The program selection module 101 of the remote server 100 receives the terminal ID sent from the user terminal 10, refers to the terminal ID database 102 based on this terminal ID (Step S06), and selects a program scenario (Step S07). In the terminal ID database 102, the terminal ID correspondence table shown in FIG. 4 is stored. The terminal ID correspondence table associates a terminal ID, a carrier (communication common carrier), and a program scenario. The associated carrier may be a terminal model or a manufacture name.

The program scenario is data that determines the type and the execution order of one or more programs to be executed on the user terminal 10. As shown in FIG. 5, for example, the program scenario A is composed of the program 01 and the program 02 and executes them in this order.

For example, when this user terminal 10 receives the terminal ID "AAA", the user terminal 10 determines "Company N" as the carrier and selects the program scenario A as the scenario. As shown in FIG. 5, the program scenario A is composed of the program 01 and the program 02 and should executes them in this order.

Then, the program selection module 101 enables programs selected by this program scenario and this scenario indicating the execution order of the selected programs to be read out to the user terminal 10. In response to access from the above-mentioned access module 12, the program selection module 101 sends the selected programs and the scenario indicating the execution order to the user terminal 10 (Step S08).

The program execution module 13 of the user terminal 10 receives programs and a program scenario that are sent from the remote server 100 and executes each program based on the program scenario (Step S09).

Instead of receiving any programs to be executed from the remote server 100, programs that are preliminarily installed in the user terminal 10 and indicated in a program scenario may be activated.

Figure 8:
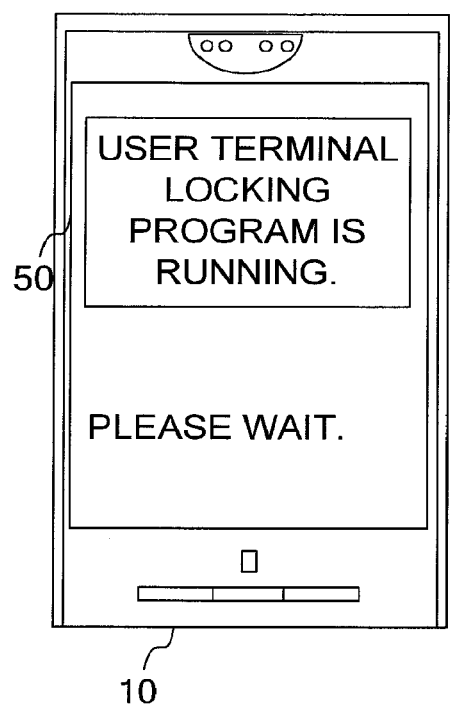
FIG. 8 is a screen image (lock screen) displayed on the user terminal 10.

One example of the program to be executed may be a program to disable (lock) key operation of the user terminal 10 as shown in FIG. 8. In the case where the user terminal 10 is lost, key operation of the user terminal 10 from a stranger can be disabled by sending a remote message to the user terminal 10.

Another example of the program may be a program to back up predetermined data stored in the user terminal 10 to a backup server communicatably connected through the public line network 3. In the case where the user terminal 10 is lost, predetermined data can be backed up by sending a remote message to the user terminal 10.

In the user terminal 10 with a global positioning system (hereinafter referred to as "GPS"), one example of the program may be a program to send the present location (latitude and longitude) information of the user terminal 10 to other terminals or servers that are communicatably connected through the public line network 3. In the case where the user terminal 10 is lost, the present location information of the user terminal 10 can be acquired by sending a remote message to the user terminal 10.

Another example of the program may be a key logger program to send log data on key operations, which were input from the user terminal 10 in the past, to other terminals or servers that are communicatably connected through the public line network 3. In the case where the user terminal 10 is lost, information on key operations input to the user terminal 10 can be acquired by sending a remote message to the user terminal 10.

Another example of the program may be a program for installation of a predetermined application. In other words, the program for installation of a predetermined program (especially application program) is sent to the user terminal 10 by sending a remote message to the user terminal 10.

Another example of the program may be a program to execute virus scan and virus check programs on the user terminal 10. In other words, data stored in the user terminal 10 can be checked for viruses by sending a remote message to the user terminal 10.

Another example of the program may be a program to display a predetermined message on the user terminal 10. In other words, the program to display a predetermined message is sent to the display unit of the user terminal 10 by sending a remote message to the user terminal 10. In the case where the user terminal 10 is lost, for example, a program to display the private information and the contact information of the owner of the user terminal may be sent.

Scenario Selection Table

One example where a program to be executed on the user terminal 10 is called from the instruction server 20 will be described with reference to FIG. 6. The scenario selection table shown in FIG. 6 is preliminarily stored in the remote server 100. When the remote message sending module 22 of the instruction server 20 generates a remote message, the remote message sending module 22 accepts an instruction ID input from a remote operator and sends the instruction ID to the user terminal 10.

Then the user terminal 10 receives the instruction ID and sends the instruction ID along with the terminal ID to the remote server 100. In the remote server 100, a program selection process (Step S07) refers to the scenario selection table and determine the program scenario, based on the instruction ID received from the user terminal 10. In the example shown in FIG. 6, when the instruction server 20 calls for instruction whose instruction ID is 1, the program scenario A1 is determined.

A remote operator can call a program to be executed using the instruction ID so as to select a program scenario to be executed on the user terminal 10. For example, a remote operator calls a scenario which allows the user terminal 10 to execute the above-mentioned backup program first, and then the key logger program or a scenario allows the user terminal to execute the virus scan program first and then send the location information acquired from a GPS to a server.

Instruction Command Correspondence Table

The instruction command input from the instruction server 20 will be described with reference to FIG. 7. It is preferred that data traffic among the instruction server 20, the user terminal 10, and the remote server 100 be as little as possible. Thus, the instruction terminal 20 sends a predetermined instruction command, and then the program execution module 13 executes a program corresponding to this instruction command with reference to the instruction command correspondence table.

The instruction command correspondence table shown in FIG. 7 is preliminarily stored in the command database 103 of the remote server 100. When the remote message sending module 22 of the instruction server 20 generates a remote message, the instruction command generation module 21 accepts an input of an instruction command from a remote operator, generates an instruction command, and sends the instruction command to the user terminal 10.

In the case where a predetermined program is executed on the user terminal 10, an input interface of the program to be executed accepts input from a user and then transits. The instruction command serves a function for specifying the transition. Specifically, the instruction command is a predetermined character, sign, and numerical value. In the example of FIG. 7, when the instruction command "311" is called, a configuration program stored in the user terminal 10 performs "3: OPEN CONFIGURATION SETTINGS", "1: OPEN WI-FI SETTING", and "1: CHECK DEACTIVATION OF WI-FI SETTING" in this order.

Figure 9:
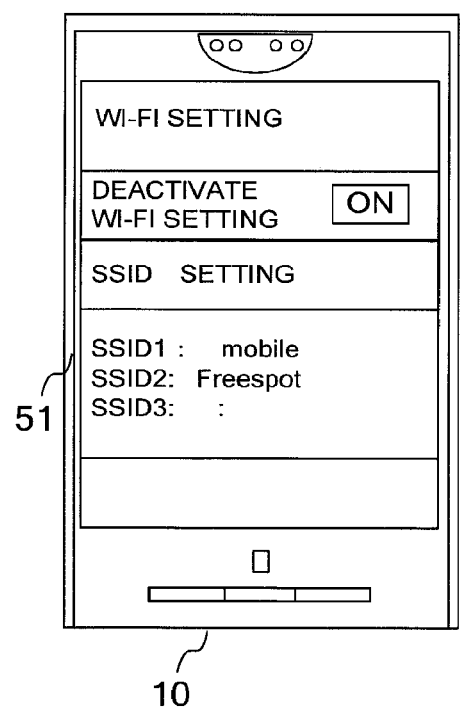
FIG. 9 is a screen image (Wi-Fi® setup screen) displayed on the user terminal 10.

Then, the user terminal 10 receives the instruction command and sends the instruction command along with the terminal ID to the remote server 100. The remote server 100 sends the instruction command that has been received from the user terminal 10 to the user terminal 10. Then, the program execution module 13 of the user terminal 10 executes a program based on the instruction command. In the above-mentioned example where the input interface transits, the configuration program selects "3: OPEN CONFIGURATION SETTINGS", "1: OPEN WI-FI SETTING", and "1: CHECK DEACTIVATION OF WI-FI SETTING" in this order and then performs thereof accordingly (see FIG. 9).

Therefore, according to the present embodiment, even if users who receive remote operation for the user terminal 10 lose their own user terminals 10, or even if they cannot operate their own terminals for certain reasons, programs other than programs preliminarily stored in the user terminal 10, which are programs read out from the remote server 100, can be executed on the user terminal 10 through software as a service (hereinafter referred to as "SaaS".)

The above-mentioned case is described as the example where a program (e.g. configuration program) executing an instruction command is preliminarily stored in the user terminal 10. However, it may not be a program preliminarily stored in the user terminal 10. Specifically, when the program selection module 101 of the remote server 100 receives an instruction command, the program selection module 101 may select a program related to this instruction command and send this program to the user terminal 10.

The above-mentioned case is described as the example where the instruction command correspondence table is stored in the remote server 100. However, the instruction command correspondence table may not be stored in the remote server 100 but the user terminal 10. In this case, the system is composed of the user terminal 10 and the instruction server 20. The instruction server 20 accepts input of a command to be executed on the user terminal 10 from an instructor, generates a remote message including the command, and sends the remote message to the user terminal 10. In response to this event, the user terminal 10 may receive the remote message through the public line network 3, refer to the instruction command correspondence table stored in the user terminal 10 based on the command, and execute a predetermined program, regardless of operation input from a user.

To achieve the means and functions as described above, a computer (including a CPU, an information processor, and various terminals) reads and executes a predetermined program. For example, a program is provided in forms recorded in a computer-readable record medium such as a flexible disk, a CD (CD-ROM etc.), and a DVD (a DVD-ROM and a DVD-RAM, etc.). In this case, a computer reads a program from a record medium, forwards the program to internal or external storage to store the program therein, and executes the program. For example, the program may be preliminarily recorded in a memory device (a record media) such as a magnetic disk, an optical disk, and a magnetic optical disk, and then provided from the memory device to a computer through a communication line.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

REFERENCE SIGNS LIST

1 Remote System
3 Public Line Network
10 User Terminal

20 Instruction Server
100 Remote Server

The invention claimed is:

1. A method of operating a mobile user terminal, the method comprising:
receiving, by the mobile user terminal, a remote message from a remote instruction terminal operatively connected to the mobile user terminal over a public line network, the remote message including (i) a terminal ID that uniquely identifies the mobile user terminal and (ii) address information indicating an address of a remote server;
in response to receiving the remote message from the remote instruction terminal, sending the terminal ID to the remote server over the public line network at the address indicated in the address information included in the remote message;
receiving back from the remote server (i) a list of programs which the remote server associates with the terminal ID sent to the remote server and (ii) a designated order in which the list of programs are to be executed; and
executing the list of programs on the mobile user terminal in the designated order,
wherein the method further comprises:
receiving, by the mobile user terminal, an instruction ID from the remote instruction terminal, the instruction ID based on input received from a remote operator of the remote instruction terminal;
sending, by the mobile user terminal, the instruction ID received from the remote instruction terminal to the remote server;
receiving back from the remote server, in response to sending the instruction ID, a program scenario identifying (i) a set of programs to be executed by the mobile user terminal and (ii) a designated order in which the set of programs are to be executed; and
executing the set of programs in the designated order on the mobile user terminal,
wherein the set of programs identified by the program scenario includes a backup program and a key logger program, the backup program configured to back up predetermined data stored in the mobile user terminal to a backup server communicatively connected to the mobile user terminal through the public line network, the key logger program configured to send log data on key operations, which were input from the mobile user terminal, to a server communicatively connected to the mobile user terminal through the public line network.

2. The method of claim 1, wherein receiving the remote message includes receiving the address information in the form of an address ID, and wherein the method further comprises the mobile user device accessing a table stored in a memory of the mobile user device, the table associating address IDs with corresponding addresses, and identifying the address of the remote server as an address that the table associates with the address ID.

3. The method of claim 2, further comprising, prior to receiving the remote message, storing the programs identified in the list of programs locally in the mobile user terminal, wherein executing the list of programs on the mobile user terminal in the designated order includes executing the programs already stored in the mobile user terminal in the designated order.

4. The method of claim 1, wherein the set of programs identified by the program scenario includes a virus scan program and a GPS (Global Positioning Satellite) location program, the virus scan program configured to execute a virus scan on the mobile user terminal, the GPS location program configured to send location information obtained from a GPS receiver in the mobile user terminal to a server communicatively connected to the mobile user terminal through the public line network.

5. The method of claim 1, wherein the set of programs identified by the program scenario includes a program to display a predetermined message on the user terminal, and wherein the method further comprises running the program to display the predetermined message on the user terminal.

6. The method of claim 5, wherein mobile user terminal has been lost, and wherein the predetermined message displayed on the user terminal includes contact information of an owner of the mobile user terminal.

7. The method of claim 1, further comprising:
receiving, by the mobile user terminal, an instruction command from the remote instruction terminal;
storing, in the mobile user terminal, a configuration command correspondence table that associates different commands with respective sets of configuration change operations; and
executing, by the mobile user terminal, a configuration program to perform the set of configuration change operations that the configuration command correspondence table associates with the received instruction command.

8. The method of claim 7, wherein the instruction command includes a series of numbers corresponding to configuration change operations in the configuration command correspondence table,
wherein a first of the series of numbers indicates a selected one of multiple first-level configuration change operations listed in the configuration command correspondence table,
wherein a second of the series of numbers indicates a selected one of multiple second-level configuration change operations listed in the configuration command correspondence table and pertaining to the selected one of the first-level configuration change operations, and
wherein a third of the series of numbers indicates a selected one of multiple third-level configuration change operations listed in the configuration command correspondence table and pertaining to the selected one of the second-level configuration change operations,
wherein executing the configuration program includes (i) operating the selected one of the first-level configuration change operations on the mobile user terminal, (ii) then operating the selected one of the second-level configuration change operations on the mobile user terminal, and (iii) then operating the selected one of the third-level configuration change operations on the mobile user terminal.

9. The method of claim 8,
wherein the selected one of the first-level configuration change operations is for opening configuration settings;
wherein the selected one of the second-level configuration change operations is for opening WI-FI settings; and
wherein the selected one of the third-level configuration change operations is for deactivating WI-FI on the mobile user device.

10. A mobile user terminal, comprising a central processing unit (CPU) and memory coupled to the CPU, the memory storing instructions which, when executed by the CPU, realize circuitry constructed and arranged to:

receive, by the mobile user terminal, a remote message from a remote instruction terminal operatively connected to the mobile user terminal over a public line network, the remote message including (i) a terminal ID that uniquely identifies the mobile user terminal and (ii) address information indicating an address of a remote server;

in response to receiving the remote message from the remote instruction terminal, send the terminal ID to the remote server over the public line network at the address indicated in the address information included in the remote message;

receive back from the remote server (i) a list of programs which the remote server associates with the terminal ID sent to the remote server and (ii) a designated order in which the list of programs are to be executed; and execute the list of programs on the mobile user terminal in the designated order, wherein the circuitry is further constructed and arranged to:

receive, by the mobile user terminal, an instruction ID from the remote instruction terminal, the instruction ID based on input received from a remote operator of the remote instruction terminal;

send, by the mobile user terminal, the instruction ID received from the remote instruction terminal to the remote server;

receive back from the remote server, in response to sending the instruction ID, a program scenario identifying (i) a set of programs to be executed by the mobile user terminal and (ii) a designated order in which the set of programs are to be executed; and execute the set of programs in the designated order on the mobile user terminal, and wherein the circuitry is still further constructed and arranged to:

receive, by the mobile user terminal, an instruction command from the remote instruction terminal;

store, in the mobile user terminal, a configuration command correspondence table that associates different commands with respective sets of configuration change operations; and execute, by the mobile user terminal, a configuration program to perform the set of configuration change operations that the configuration command correspondence table associates with the received instruction command.

11. The mobile user terminal of claim 10, wherein the instruction command includes a series of numbers corresponding to configuration change operations in the configuration command correspondence table, wherein a first of the series of numbers indicates a selected one of multiple first-level configuration change operations listed in the configuration command correspondence table, wherein a second of the series of numbers indicates a selected one of multiple second-level configuration change operations listed in the configuration command correspondence table and pertaining to the selected one of the first-level configuration change operations, and wherein a third of the series of numbers indicates a selected one of multiple third-level configuration change operations listed in the configuration command correspondence table and pertaining to the selected one of the second-level configuration change operations, wherein, when constructed and arranged to execute the configuration program, the circuitry is further constructed and arranged to (i) operate the selected one of the first-level configuration change operations on the mobile user terminal, (ii) then operate the selected one of the second-level configuration change operations on the mobile user terminal, and (iii) then operate the selected one of the third-level configuration change operations on the mobile user terminal.

12. A computer-program product including non-transitory computer readable medium storing instructions which, when executed by a CPU of a mobile user terminal, cause the CPU to perform a method of operating the mobile user terminal, the method comprising:

receiving, by the mobile user terminal, a remote message from a remote instruction terminal operatively connected to the mobile user terminal over a public line network, the remote message including (i) a terminal ID that uniquely identifies the mobile user terminal and (ii) address information indicating an address of a remote server;

in response to receiving the remote message from the remote instruction terminal, sending the terminal ID to the remote server over the public line network at the address indicated in the address information included in the remote message;

receiving back from the remote server (i) a list of programs which the remote server associates with the terminal ID sent to the remote server and (ii) a designated order in which the list of programs are to be executed; and executing the list of programs on the mobile user terminal in the designated order, wherein the method further comprises:

receiving, by the mobile user terminal, an instruction ID from the remote instruction terminal, the instruction ID based on input received from a remote operator of the remote instruction terminal;

sending, by the mobile user terminal, the instruction ID received from the remote instruction terminal to the remote server;

receiving back from the remote server, in response to sending the instruction ID, a program scenario identifying (i) a set of programs to be executed by the mobile user terminal and (ii) a designated order in which the set of programs are to be executed; and executing the set of programs in the designated order on the mobile user terminal, wherein the set of programs identified by the program scenario includes a virus scan program and a GPS (Global Positioning Satellite) location program, the virus scan program configured to execute a virus scan on the mobile user terminal, the GPS location program configured to send location information obtained from a GPS receiver in the mobile user terminal to a server communicatively connected to the mobile user terminal through the public line network.

13. The computer-program product of claim 12, wherein the method further comprises:

receiving, by the mobile user terminal, an instruction command from the remote instruction terminal;

storing, in the mobile user terminal, a configuration command correspondence table that associates different commands with respective sets of configuration change operations; and executing, by the mobile user terminal, a configuration program to perform the set of configuration change operations that the configuration command correspondence table associates with the received instruction command.

14. The computer-program product of claim 13, wherein the instruction command includes a series of numbers corresponding to configuration change operations in the configuration command correspondence table,
   wherein a first of the series of numbers indicates a selected one of multiple first-level configuration change operations listed in the configuration command correspondence table,
   wherein a second of the series of numbers indicates a selected one of multiple second-level configuration change operations listed in the configuration command correspondence table and pertaining to the selected one of the first-level configuration change operations, and
   wherein a third of the series of numbers indicates a selected one of multiple third-level configuration change operations listed in the configuration command correspondence table and pertaining to the selected one of the second-level configuration change operations,
   wherein executing the configuration program includes (i) operating the selected one of the first-level configuration change operations on the mobile user terminal, (ii) then operating the selected one of the second-level configuration change operations on the mobile user terminal, and (iii) then operating the selected one of the third-level configuration change operations on the mobile user terminal.

15. The computer-program product of claim 13, wherein the set of programs identified by the program scenario includes a program to display a predetermined message on the user terminal, wherein mobile user terminal has been lost, and wherein the predetermined message displayed on the user terminal includes contact information of an owner of the mobile user terminal.

\* \* \* \* \*